United States Patent [19]
Kleiner

[11] 3,726,323
[45] Apr. 10, 1973

[54] WEDGE COUPLING BETWEEN A DRIVING SHAFT AND AN ECCENTRIC RING OF A DOBBY MECHANISM

[75] Inventor: Walter Kleiner, Wadenswil, Switzerland

[73] Assignee: Staubli Ltd., Horgen-Zurich, Switzerland

[22] Filed: May 26, 1971

[21] Appl. No.: 146,878

[30] Foreign Application Priority Data

May 29, 1970 Switzerland.................................8033

[52] U.S. Cl.....................................................139/66
[51] Int. Cl..................................................D03c 1/00
[58] Field of Search .....................139/66, 73; 74/570

[56] References Cited

UNITED STATES PATENTS

| | | | |
|---|---|---|---|
| 1,256,644 | 2/1918 | Barlow | 139/66 |
| 3,180,366 | 4/1965 | Hoeing | 139/66 |
| 3,468,347 | 9/1969 | Fumat | 139/66 |

*Primary Examiner*—Henry S. Jaudon
*Attorney*—Woodhams, Blanchard and Flynn

[57] ABSTRACT

Dobby, in which the movement of the heald shafts is effected through a connecting rod (18), which connecting rod embraces an eccentric ring (28) on the driving shaft (15). Release of the movement is effected by a coupling wedge (13), which is supported in the eccentric ring and for control purposes connects alternatively with the drive shaft or the connecting rod. Resilient semicircular guide rails (16, 16') are provided on the connecting rod, which guide rails serve as guides for the coupling wedge during movement of same or as holding members during its coupling with the connecting rod. Through the resilient arrangement of the guide rails, damage to the dobby is avoided, in the event of a malfunction.

7 Claims, 7 Drawing Figures

Fig. 5
Fig. 6
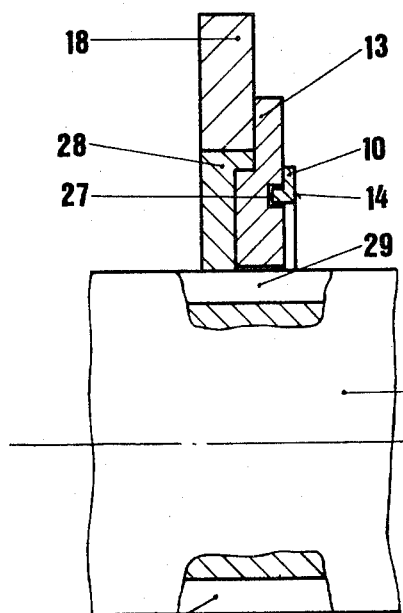
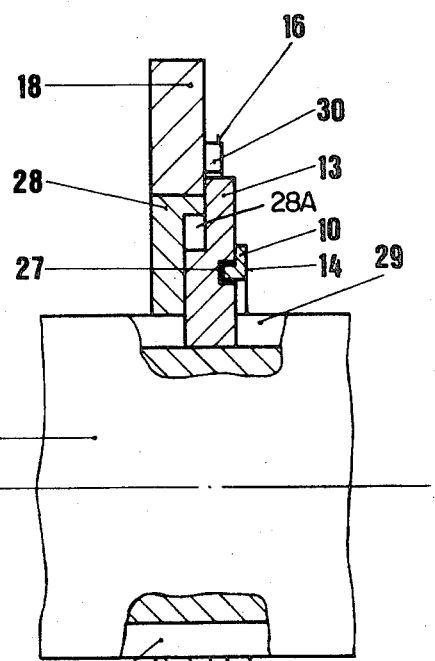
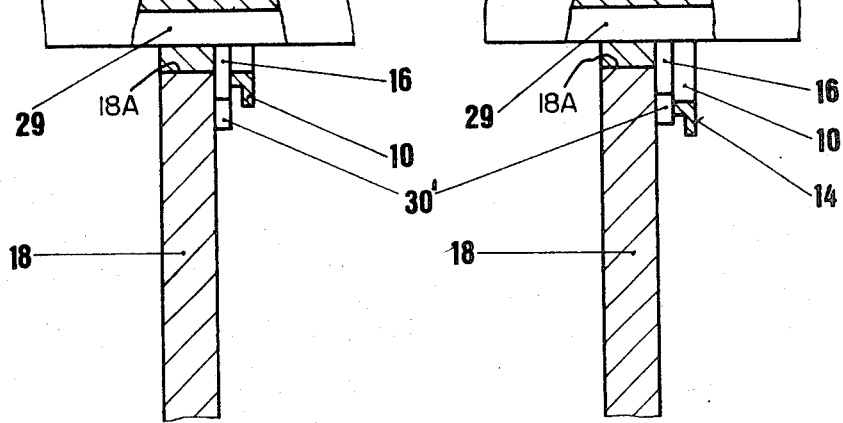
Fig. 7
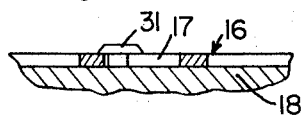
INVENTOR.
WALTER KLEINER
BY
Wardhams, Blanchard & Flynn
ATTORNEYS

WEDGE COUPLING BETWEEN A DRIVING SHAFT AND AN ECCENTRIC RING OF A DOBBY MECHANISM

CROSS REFERENCE

The application is related to my copending applications Ser. Nos 146,875 and 146,867 filed concurrently herewith and reference is to be made thereto.

The invention relates to an apparatus for the blocking in rest position, and for safety during operation, of a coupling wedge, particularly of a dobby, with a continuously or discontinuously rotating driving shaft and an eccentric ring supported thereon, which eccentric ring carries a connecting rod for the drive of a heald shaft, whereby the wedge is supported radially movably in the eccentric ring and according to a patternlike control either engages a groove of the driving shaft or becomes effectively connected to the connecting rod, and a method for operating this apparatus.

Driving mechanisms for dobbies are known which have wedge couplings in which for each heald shaft an eccentric ring is arranged between the driving shaft and the connecting rod, which latter converts the rotational movement into a translatory movement. A wedge is provided on said ring, which wedge is controlled from a pattern card and, due to its approximately radial movement on the eccentric ring, brings said eccentric ring into engagement either with the driving shaft or with the connecting rod. These two control positions are required in order to move the annexed heald shaft into the upper shed or lower shed position or to hold same in one of these two positions. For certain jobs on the weaving machines, for example adjustment of the heald shafts, it is advantageous to move all heald shafts into the central position which is achieved by having the wedge engage the driving shaft only halfway. In the case of this intentionally achieved engaging position, the wedge is, however, also in a half engaging position with the connecting rod. If no means were provided in the coupling to meet this situation, this would lead to an overload of any one of the segments. The same shortcoming, however, also occurs in the case of an unintentional miscontrol of the wedge.

The principal objective of the invention is an arrangement which eliminates this disadvantage.

The apparatus of the described type is characterized in that two approximately semicircular guide rails are arranged radially movably on the connecting rod approximately concentrically to the outer circumference of the eccentric ring, whereby each of them abuts against fixed supports under the effect of a radially inwardly directed spring tension. In this position they serve as a guide for the wedge which is in normal engagement with the shaft, they serve in resiliently retracted condition as a guide for the wedge which is in abnormal engagement with the shaft or they serve as a holding member for a wedge which is not in engagement with the shaft.

The method for operating the apparatus comprises, according to the invention in that, when the wedge is controlled outwardly, said wedge engages the zone formed by the contact points of the guide rails and is held there, and that, when the wedge is controlled inwardly, that is toward the driving shaft, and engages there, the wedge abuts the guide rail during the rotation with the driving shaft and the eccentric ring and is kept by same from disengagement of the driving shaft, furthermore that, when the wedge is half engaging and held in this position by the control members — namely the wedge partly engages the driving shaft and partly engages the zone, formed of the contact points of the guide rails, — said wedge, upon rotation of the driving shaft and thus also of the wedge, presses the guide rail into the slots outwardly against its spring effect and then the wedge slides along in this half engaging position relative to the driving shaft of the guide rail.

One exemplary embodiment of the subject matter of the invention is illustrated in the drawings. The figures illustrate the apparatus in various operating positions, namely:

FIG. 5 is a cross-sectional view along the line X—X of FIG. 1;

FIG. 6 is a cross-sectional view along the line Y—Y of FIG. 2; and FIG. 7 is a sectional view taken along the line VII—VII of FIG. 1.

Figure 1:
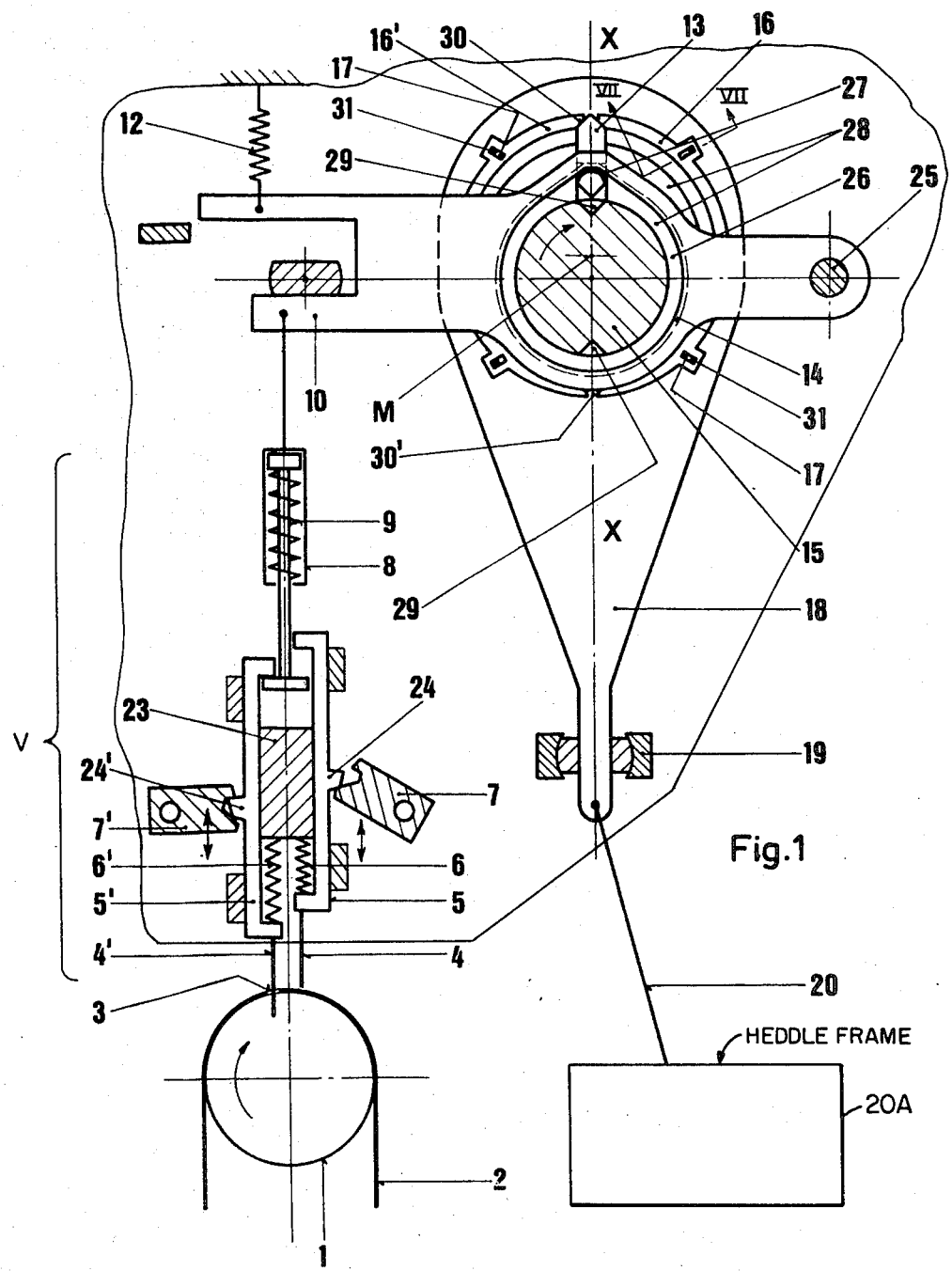
FIG. 1 is a schematic view of the coupling and the control mechanism of a dobby in upper shed position for the controlled heald shaft and with the wedge disengaged from the shaft.

The pattern card 2 which serves for controlling the heald shafts 20A is moved together with the cylinder 1. The control opening 3 is read by the reading needles 4, 4' by urging the supports 5, 5' of the needles by means of the springs 6, 6' away from the stationary block 23 and toward the pattern card. If no control opening 3 is provided in the pattern card, the needle 4, 4' stands on the card 2 and the rocking lever 7, 7' swings past the nose 24, 24' of the support 5, 5'. However, if an opening 3 is provided in the control card 2, the needle moves a small distance into the opening under the pressure of the spring 6, 6', which causes the nose 24, 24' to reach the field of traverse of the rocking lever 7, 7' and the rocking lever 7, 7' takes along the support 5, 5' through the nose 24, 24', which support acts through the tension element 8 and the compensating spring 9 to pull the control arm 10 downwardly against the force of the spring 12. The force of the compensating spring 9 must be greater than the force of the spring 12 holding back the control arm 10.

The control arm 10 is pivotably supported on the axis 25 and has an opening 26 in which a continuously or intermittently driven, as the case may be, driving shaft 15 of the dobby is positioned. The 26 has an axially extending rim or edge 14 therearound in the manner of a collar and is received in a groove 27 (FIGS. 5 and 6) in the wedge 13 where it serves as a controlling cam surface. The wedge is supported for radial movement in a guide 28A (FIG. 6) in the eccentric ring 28 and can engage either one of the recesses 29 of the driving shaft 15 or it may engage one of the zones 30, 30' between the ends of the resilient guide rails 16, 16'.

The resilient, spring steel, guide rails 16 and 16' are semicircular in shape and are arranged to form generally a circle which is radially movable on a connecting rod 18. The guide rails are located approximately concentrically to the outer circumference of the eccentric ring 28. Each ring 16 and 16' abuts against fixed supports 31 under the effect of a resilient, radially inwardly directed spring tension. The guide rings 16 and 16' guide the wedge 13 when same is in engagement with the shaft 15 and moved through a rotational path thereby. The rings 16 and 16' are resiliently retracted when the wedge 13 is improperly engaged with the shaft 15.

Each ring has at least two approximately radially extending slots 17 so that the spring tension of the guide rails brings same into the innermost position with respect to the slots and toward the driving shaft 15. More specifically, the extended axis of each of the slots 17 intersects the theoretical connecting line between the two zones 30 and 30' between the ends of the rings 16 and 16' closer toward its adjacent end than that at which the central point M of the opening 26 in the connecting rod 18 will ever be positioned. The ends of rings 16 and 16' are tapered and diverge inwardly at the ends to form the open grooves or zones 30 and 30'.

The connecting rod 18 has an opening 18A (FIGS. 5 and 6) slidingly therethrough which receives the eccentric ring 28 which is rotatably supported on the driving shaft 15. Said connecting rod converts during rotation of the coupled eccentric ring with the driving shaft the rotational movement of the shaft into a vertical translatory movement for the heald shaft. The guide 19 holds the connecting rod 18 against rotation. The tension member or cable 20 is connected to the 20A shaft 20 A and the guided end of the connecting rod 18. For pins 31 are arranged on the connecting rod 18 which pins are used through the slots 17 as guide and stops for the guide rails 16.

Figure 2:
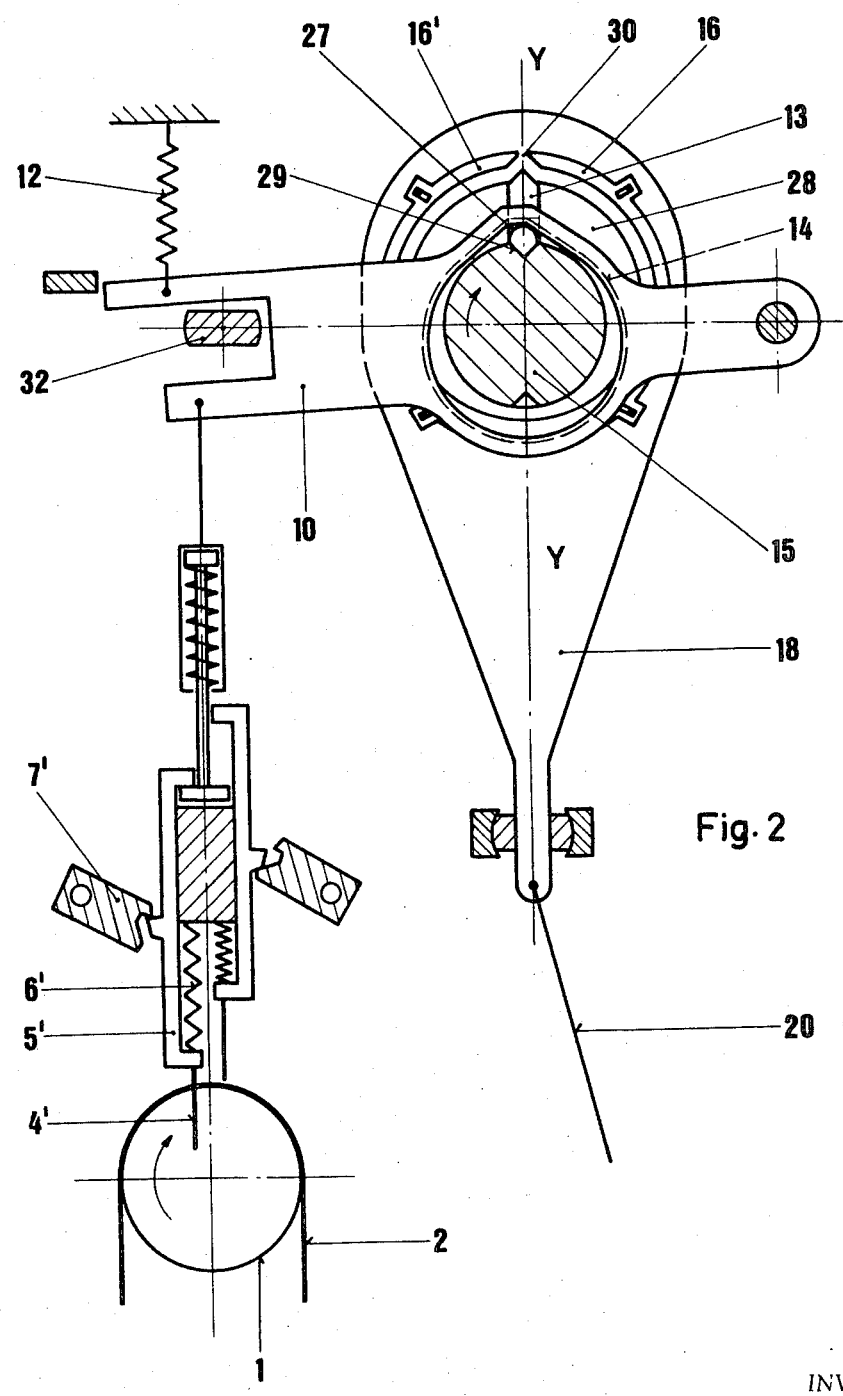
FIG. 2 illustrates the same view with the wedge engaging the shaft.

Initially, (and not illustrated) the left needle support 5' is free of engagement with the rocking lever 7' and the needle 4' has penetrated into the opening 3 of the pattern card under the effect of the spring 6'. Through this the nose 24' reaches the zone of the rocking lever 7' which is engaged by the rocking lever to the needle all of the way in. Under the effect of the tension spring 12, the control arm 10 is initially (FIG. 1) in its highest position. Thus, on one side it abuts the rotatable cam 32 and on the other side it presses the wedge 13 into the zone 30. The heald shaft is in the upper shed position and the driving shaft 15 rotates without influencing the eccentric ring 28. Upon the lowering of the needle support 5' by the rocking lever, the control arm 10 is now also actuated and reaches the position illustrated in FIG. 2 against the bias of the spring 12. At the same time the wedge 13 is disengaged from the zone 30 (position FIGS. 1 and 5) and is moved toward and into engagement with the recess 29 of the shaft 15 (position FIGS. 2 and 6) by having the guide edge 14 on the arm 10 move the wedge 13 radially inwardly by reason of the connection through the groove 27 (FIGS. 5 and 6) in the wedge 13. The eccentric ring 28 is thereby coupled to the driving shaft 15 and by rotation of the eccentric ring for 180°, the heald shaft connected to the connecting rod 18 is lowered and directed into a lower shed position.

If during the operative cycle of the machine the sequence of operation of the rocking levers permits a needle to be lifted out of the pattern card by the spring 9, the spring 12, which is at this time under tension, will also cause an upward movement to be created on the arm 10 about the axis 25. As a result, when the wedge 13 traverses the periphery of the opening 26 or 360° and returns to an aligned position between the recess 29 and the zone 30, the force of the spring 12 will cause the wedge to move up out of the recess 29 and into the zone 30.

Figure 3:
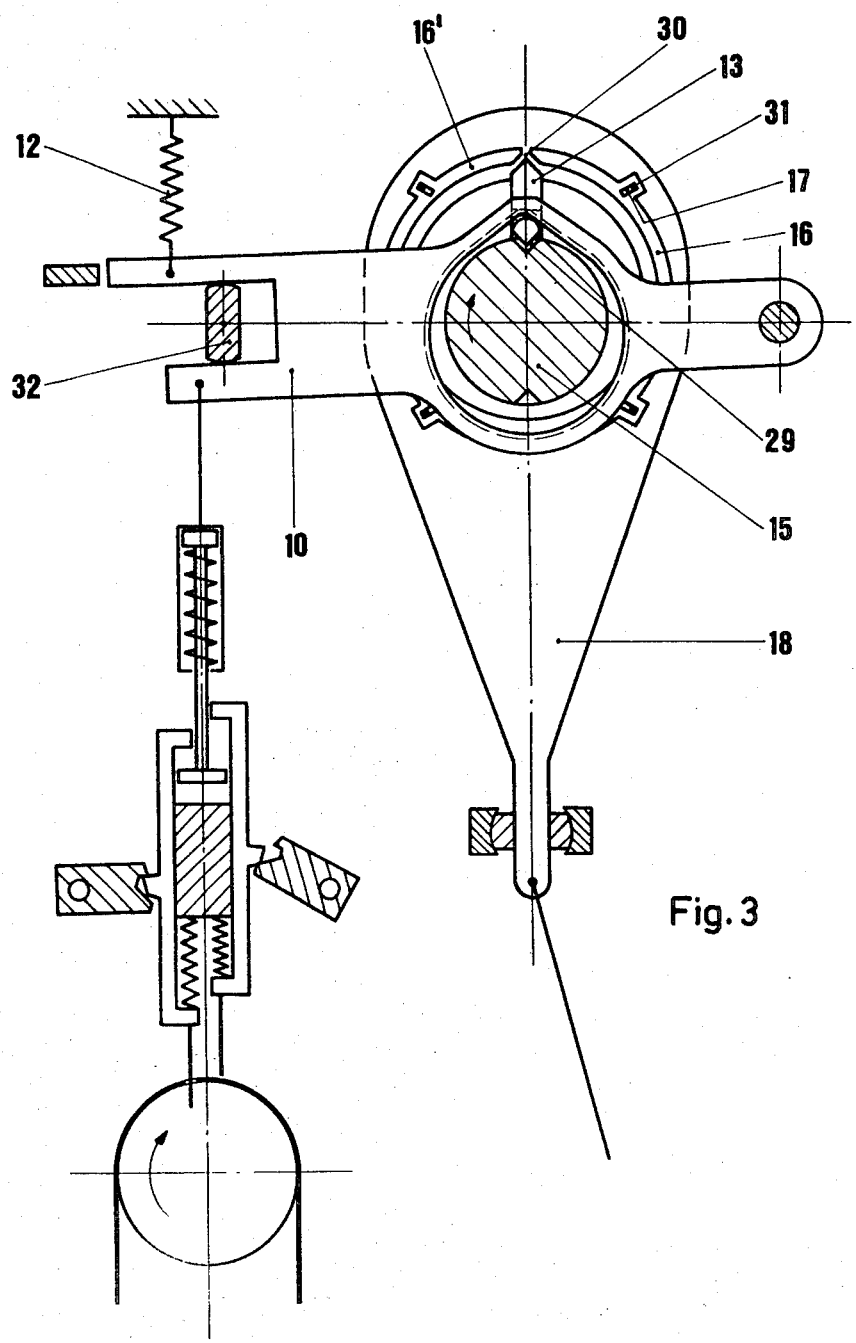
FIG. 3 illustrates the same view with a controlled dobby and a wedge which half engages the shaft for achieving the central position of the heald shaft.
Figure 4:
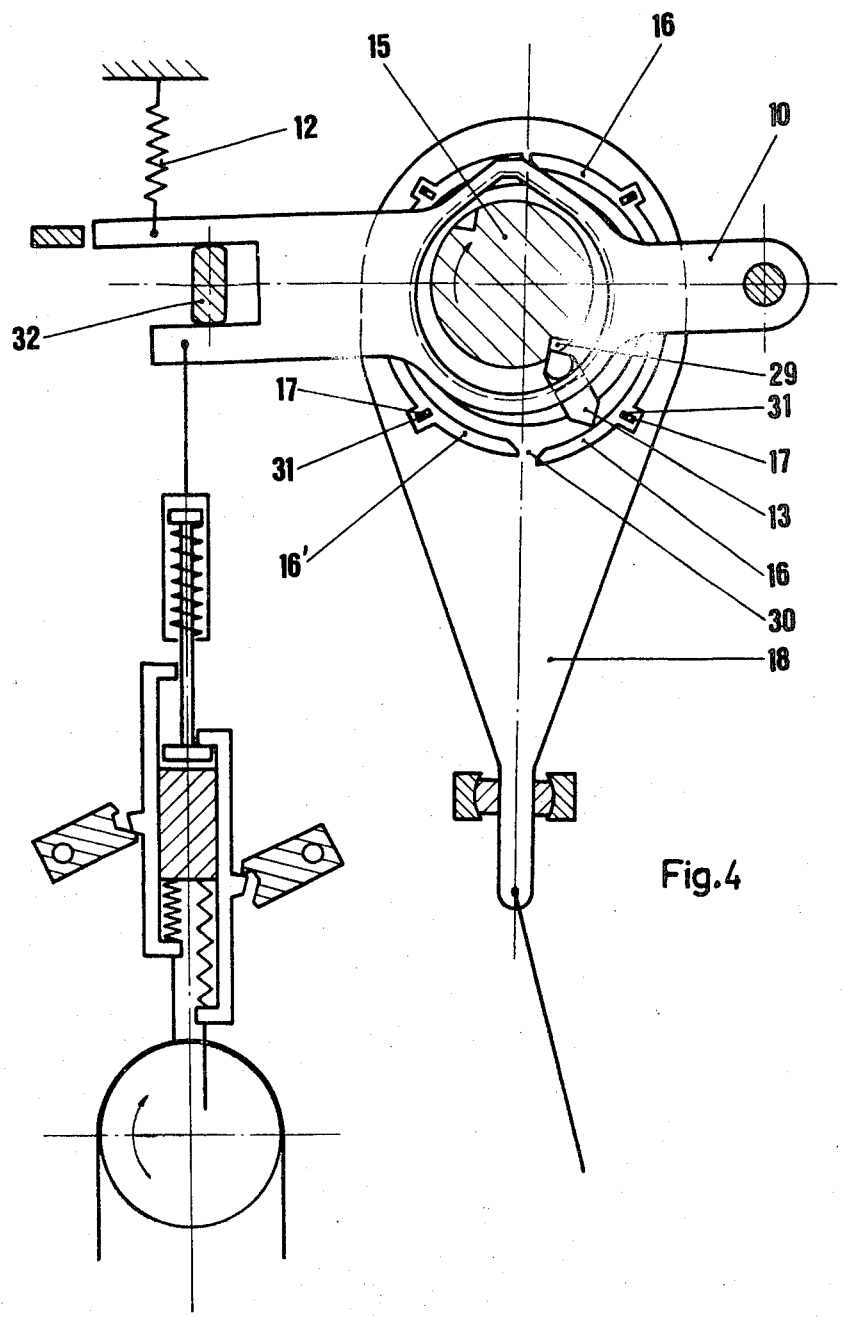
FIG. 4 illustrates the control and view corresponding to FIG. 3 after the driving shaft has moved one-third of a rotation.

If all heald shafts — independent from the position controlled by the pattern card and the reading-in mechanism — are to take the central position between upper shed positions and lower shed — which is for example important for relaxing all warp threads during a longer work halt —, the cam 32 is then rotated for 90°. This brings the parts to the position according to FIG. 3. The entire reading-in mechanism V with reference numerals 1 to 9 is rendered nonfunctional and can no longer actuate the control arm 10. As is illustrated in FIG. 3, the control arm 10 now moves the wedge 13 into a central position in which it engages both the zone 30 and also the recess 29 where it is moved together with the shaft 15. If no suitable safety mechanism is provided on the coupling, this control would lead to breakage of any one of the pieces. Since, however, the guide rails 16, 16' consist on the one hand of resilient material or one the other hand their mounting through the pins 31 and the slots 17 is made flexible, the corresponding guide rail 16, as is illustrated in FIG. 4, can yield. In order to bring all heald shafts into the central position, the driving shaft with the thus controlled wedge is rotated 90°.

The above-described process takes place also if for any reason the wedge is directed erroneously into a central position.

The yieldable characteristic of the guide rails 16, 16' is important to the inventive function of the wedge coupling. Where same do not consist of a resilient steel, springs can be arranged outside the rails which springs press same radially inwardly to the limit provided by the pins 31 in the slots 17.

The longitudinal extent of the slots 17 is advantageously so arranged that the axes of two slots each which are adjacent to one of the zones 30, 30 intersect the central position of the connecting rod 18 on the side facing said zone relative to the central point M of the opening of the connecting rod 18.

The embodiments of the invention in which an exclusive property or privilege is claimed are defined as follows:

1. In a dobby having a rotatable drive shaft, an eccentric ring mounted on said drive shaft and rotatable with respect thereto, a connecting rod having means defining an opening therein and adapted to rotatably receive said eccentric ring therein and wedge means radially movable toward and away from said drive shaft under control of a pattern card reading mechanism for selectively connecting said eccentric ring to said drive shaft, the improvement comprising:

a pair of generally semicircular guide rails, said guide rails having a resiliently flexible characteristic;

support means for supporting said guide rails on said connecting rod approximately concentric to the outer circumference of the eccentric ring, and supporting said guide rails for a generally radially outward movement away from said eccentric ring against a return force generated by the resiliently flexible characteristic of guide rings.

2. The improvement according to claim 1, including spring means for urging said guide rails to the radially innermost position.

3. The improvement according to claim 2, wherein said guide rails are made of a spring steel to define said spring means; and
   wherein said mounting means comprise a plurality of slots on said guide rails, said guide rails being supported on said connecting rod by pins which are received in said slots.

4. The improvement according to claim 3, wherein said wedge means includes a wedge slidably mounted on said eccentric ring between radially outer positions wherein said eccentric ring is free of connection to said drive shaft and radially inner positions wherein said eccentric ring is connected to said drive shaft; and
   wherein said pair of semicircular guide rails are mounted on said connecting rod to define generally a circle, the spacing between the mutually adjacent ends of said guide rails defining zones for receiving said wedge when in said radially outer position.

5. The improvement according to claim 4, wherein said drive shaft includes means defining at least one recess;
   wherein said wedge is adapted to be received in said recess when in said radially inner position to connect said eccentric ring to said drive shaft; and
   wherein said wedge is further adapted to be simultaneously received in both said recess and one of said zones, a rotation of said drive shaft effecting a movement therewith of said wedge and said guide rail engaging said wedge being moved radially outwardly by said wedge to permit said wedge to move with said drive shaft and to thereby prevent damage to said dobby.

6. The improvement according to claim 3, wherein the extended axis of each of said slots intersects the theoretical line connecting the zones between said guide rails at a point closer toward the respective zone than that at which the central point of the opening in said connecting rod will ever be positioned.

7. The improvement according to claim 3, wherein the ends of said guide rails are tapered and diverge inwardly.

* * * * *